(12) United States Patent
Mashtizadeh et al.

(10) Patent No.: US 8,478,725 B2
(45) Date of Patent: Jul. 2, 2013

(54) METHOD AND SYSTEM FOR PERFORMING LIVE MIGRATION OF PERSISTENT DATA OF A VIRTUAL MACHINE

(75) Inventors: Ali Mashtizadeh, El Cerrito, CA (US); Osten Kit Colbert, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 137 days.

(21) Appl. No.: 12/881,970

(22) Filed: Sep. 14, 2010

(65) Prior Publication Data

US 2011/0066597 A1   Mar. 17, 2011

Related U.S. Application Data

(60) Provisional application No. 61/242,360, filed on Sep. 14, 2009, provisional application No. 61/242,340, filed on Sep. 14, 2009.

(51) Int. Cl.
*G06F 7/00* (2006.01)
*G06F 17/00* (2006.01)

(52) U.S. Cl.
USPC ........... 707/640; 707/646; 707/654; 707/661; 707/667; 711/161; 711/162

(58) Field of Classification Search
USPC .......... 707/640, 646, 654, 661, 667, 999.204; 711/161, 162
See application file for complete search history.

(56) References Cited

U.S. PATENT DOCUMENTS

| | | | |
|---|---|---|---|
| 8,346,726 B2 * | 1/2013 | Liu et al. ...................... 707/640 |
| 2004/0001408 A1 * | 1/2004 | Propps et al. ............... 369/53.17 |
| 2007/0050573 A1 * | 3/2007 | Arakawa et al. .............. 711/162 |
| 2008/0052480 A1 * | 2/2008 | Satoyama et al. ............ 711/162 |
| 2008/0086611 A1 * | 4/2008 | Fujibayashi .................. 711/162 |
| 2008/0222375 A1 * | 9/2008 | Kotsovinos et al. ........... 711/162 |
| 2008/0271025 A1 * | 10/2008 | Gross et al. .................... 718/102 |
| 2009/0113109 A1 * | 4/2009 | Nelson et al. ..................... 711/6 |
| 2009/0187899 A1 * | 7/2009 | Mani et al. ..................... 717/168 |
| 2009/0293056 A1 * | 11/2009 | Ferris ................................ 718/1 |
| 2010/0017573 A1 * | 1/2010 | Shinozaki et al. ............ 711/162 |
| 2010/0082920 A1 * | 4/2010 | Larson .......................... 711/162 |
| 2010/0299309 A1 * | 11/2010 | Maki et al. .................... 707/640 |

* cited by examiner

*Primary Examiner* — Hares Jami

(57) ABSTRACT

Persistent data of virtual machines are migrated between and across data stores using a method that provides for a bounded disk size, low performance overhead, arbitrarily low downtimes, atomic switch-over, and ability to build optimizations based around block level heuristics. The method includes the steps of copying the persistent data at the source data store to the destination data store, updating a bitmap data structure during the copying step to indicate which blocks of the persistent data have been modified during the copying step, identifying the blocks that have been modified during the copying step using the bitmap data structure, and copying the identified blocks to the destination data store. The method may further include the step of determining that the number of the identified blocks is below a predetermined threshold and suspending the virtual machine prior to the second copying step.

2 Claims, 4 Drawing Sheets

METHOD AND SYSTEM FOR PERFORMING LIVE MIGRATION OF PERSISTENT DATA OF A VIRTUAL MACHINE

CROSS-REFERENCE TO RELATED APPLICATIONS

This application claims the benefit of U.S. Provisional patent application Ser. No. 61/242,360, filed Sep. 14, 2009 and U.S. Provisional patent application Ser. No. 61/242,340, filed Sep. 14, 2009. The entire contents of both of these applications are incorporated by reference herein.

BACKGROUND

In a process known as live migration of virtual machines (VMs), a VM's runtime state can be moved without disruption or downtime to a different physical host. Live migration of VMs is essential for increasing the mobility of virtual machines and improving resource utilization in a data center. In addition, techniques have been developed for system administrators to migrate persistent data of a VM, e.g., its virtual disks, between or across data stores with no significant disruption or downtime. This enables efficient and flexible storage management in a virtual infrastructure, such as array migration, storage upgrade, and dynamic optimization of storage performance.

One technique for migrating persistent data of a VM between or across data stores with very little disruption or downtime is described in U.S. patent application Ser. No. 12/184,134, filed Feb. 9, 2009 and entitled, "Online Virtual Machine Disk Migration," the entire contents of which is incorporated by reference herein. In this technique, redo logs are employed to store copies of those blocks of a VM's persistent data that have changed while the migration process is being carried out iteratively. Each redo log stores copies of the changed blocks during one iteration of the migration process and is copied over to the destination at the end of the iteration. The migration process is completed by pausing the VM and merging the redo logs at the destination with an initial copy of the VM's persistent data that was created at the destination at the beginning of the migration process.

One of the drawbacks of the redo log approach is that the virtual machine whose persistent data is being migrated uses two different data stores to store its persistent data while the process is ongoing. This is undesirable because relying on two data stores increases vulnerability of the virtual machine during data migration in that a crash of either the source data store or the destination data store will become a failure condition.

Another drawback of the redo log approach is the size of the redo logs. If the VM has a lot of write activity during the migration process, the redo logs can become quite large in size and consume extra storage capacity. Further, if the redo logs are large in size, the final step of merging the redo logs with the initial copy of the VM's persistent data, which is carried out while the VM is paused, may take too long and result in VM downtime.

SUMMARY

One or more embodiments of the present invention provide techniques for migrating persistent data, such as persistent data associated with virtual machines, between and across data stores. The techniques described herein improves upon conventional techniques and provides advantages such as bounded disk size, low performance overhead, arbitrarily low downtimes, atomic switch-over, and ability to build optimizations based around block level heuristics.

A method of migrating persistent data from a source data store to a destination data store, according to an embodiment of the present invention, includes the steps of copying the persistent data at the source data store to the destination data store, updating a data structure during the copying step to indicate which blocks of the persistent data have been modified during the copying step, identifying the blocks that have been modified during the copying step using the data structure, and iteratively copying the modified blocks to the destination data store until the number of modified blocks is smaller than a threshold number. The migrated persistent data may be associated with one or more virtual machines, or more generally, any disk image, such as a logical unit number (LUN), a disk volume, or a file system.

Further embodiments of the present invention include, without limitation, a non-transitory computer-readable storage medium that includes instructions that enable a processing unit to implement one or more aspects of the above methods as well as a system configured to implement one or more aspects of the above methods.

DETAILED DESCRIPTION

Figure 1:
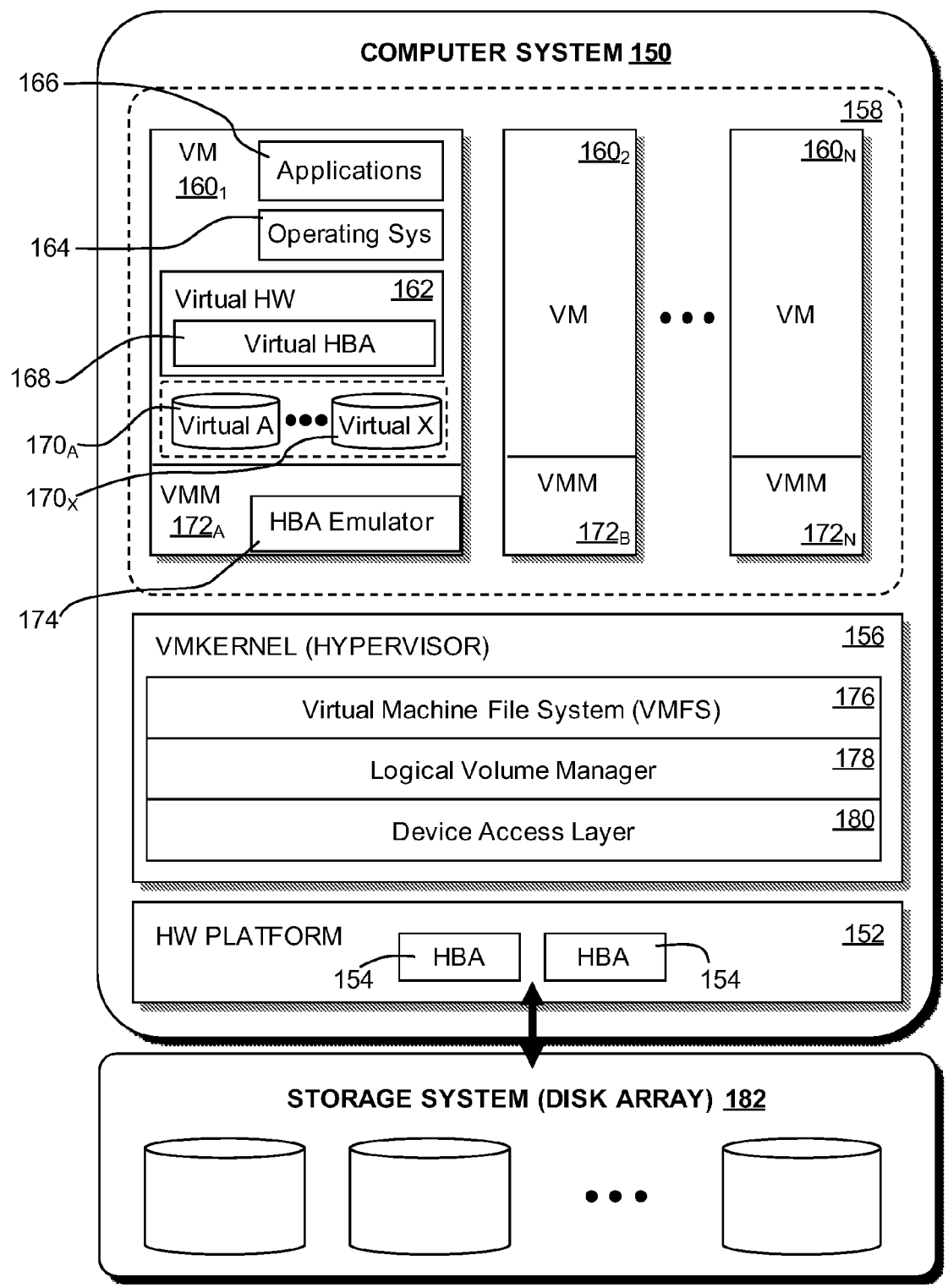
FIG. 1 depicts a block diagram of a virtualized computer system in which one or more embodiments of the present invention may be practiced.

FIG. 1 depicts a block diagram of a virtualized computer system in which one or more embodiments of the present invention may be practiced. Computer system 150 may be constructed on a conventional server-class, hardware platform 152 including host bus adapters (HBA) 154 in addition to conventional platform processor, memory, and other standard peripheral components (not shown). Hardware platform 152 may be coupled to an enterprise-class storage system 182. Examples of storage system 182 may be a network attached storage (NAS) device, storage area network (SAN) arrays, or any other similar disk arrays known to those with ordinary skill in the art. In a typical implementation, there may be multiple computer systems similar to computer system 150 connected via a network fabric to multiple storage systems similar to storage system 182.

VMkernel 156 is installed on hardware platform 152 and supports virtual machine execution space 158 within which multiple VMs $160_1$-$160_N$ may be concurrently instantiated and executed. Each such virtual machine $160_1$-$160_N$ implements a virtual hardware (HW) platform 162 that supports the installation of a guest operating system 164 which is capable of executing applications 166. Similar to guest operating system 130, examples of guest operating system 164 may be Microsoft Windows, Linux, Solaris x86, NetWare, FreeBSD or any other operating system supported by the virtualization software. In each instance, guest operating system 164 includes a native file system layer (not shown), for example, either an NTFS or an ext3 type file system layer. The native file system layer interfaces with virtual hardware platform 162 to access, from the perspective of guest operating system 164, a data storage HBA, which in reality, is virtual HBA 168 implemented by VMM 172 that emulates virtual disks $170_A$-$170_X$. The virtualization of disk storage is therefore transparent to guest operating system 164, which accesses virtual disk $170_X$ as it would any physical storage device.

Virtual machines maintain state information, some of which is volatile and would be lost upon crash of the virtual machine, and some of which is non-volatile, or persistent, which survives failure of either the virtual machine or its physical host. Storage devices for maintaining persistent state information include non-volatile RAM (NVRAM), flash drives, ordinary hard disks, RAID storage devices, and storage arrays. In a VM, persistent state information includes static data and dynamic data. As used herein, "static data" include configuration data and other data that change infrequently while the VM is running, and "dynamic data" include data that change more frequently while the VM is running based on activities of the guest operating system and the guest applications, such as one or more virtual disks and swap files.

Figure 2:
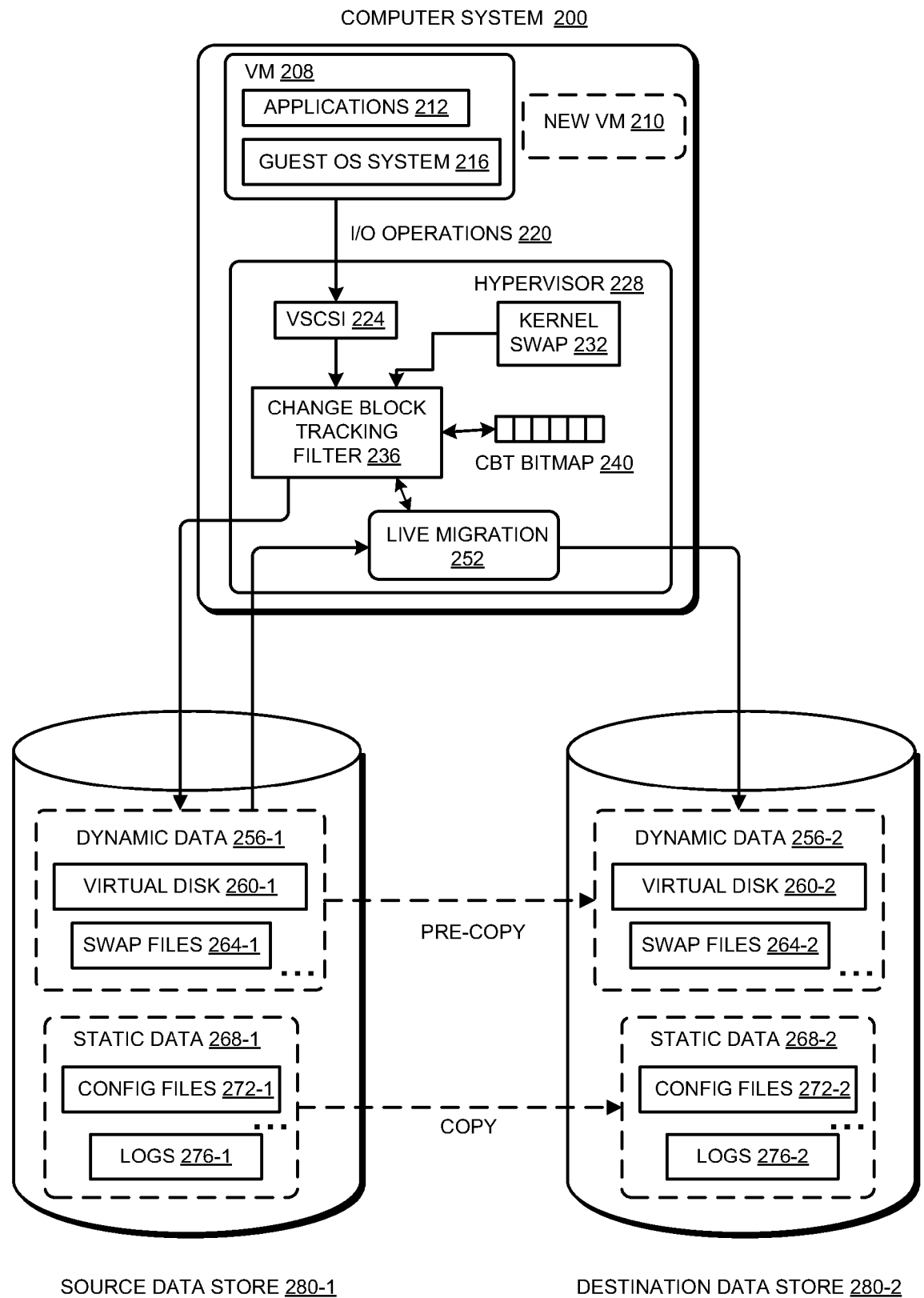
FIG. 2 depicts a computer system having a virtual machine and source and destination data stores between which a process of migrating persistent VM data according to one or more embodiments of the present invention are carried out.
Figure 3:
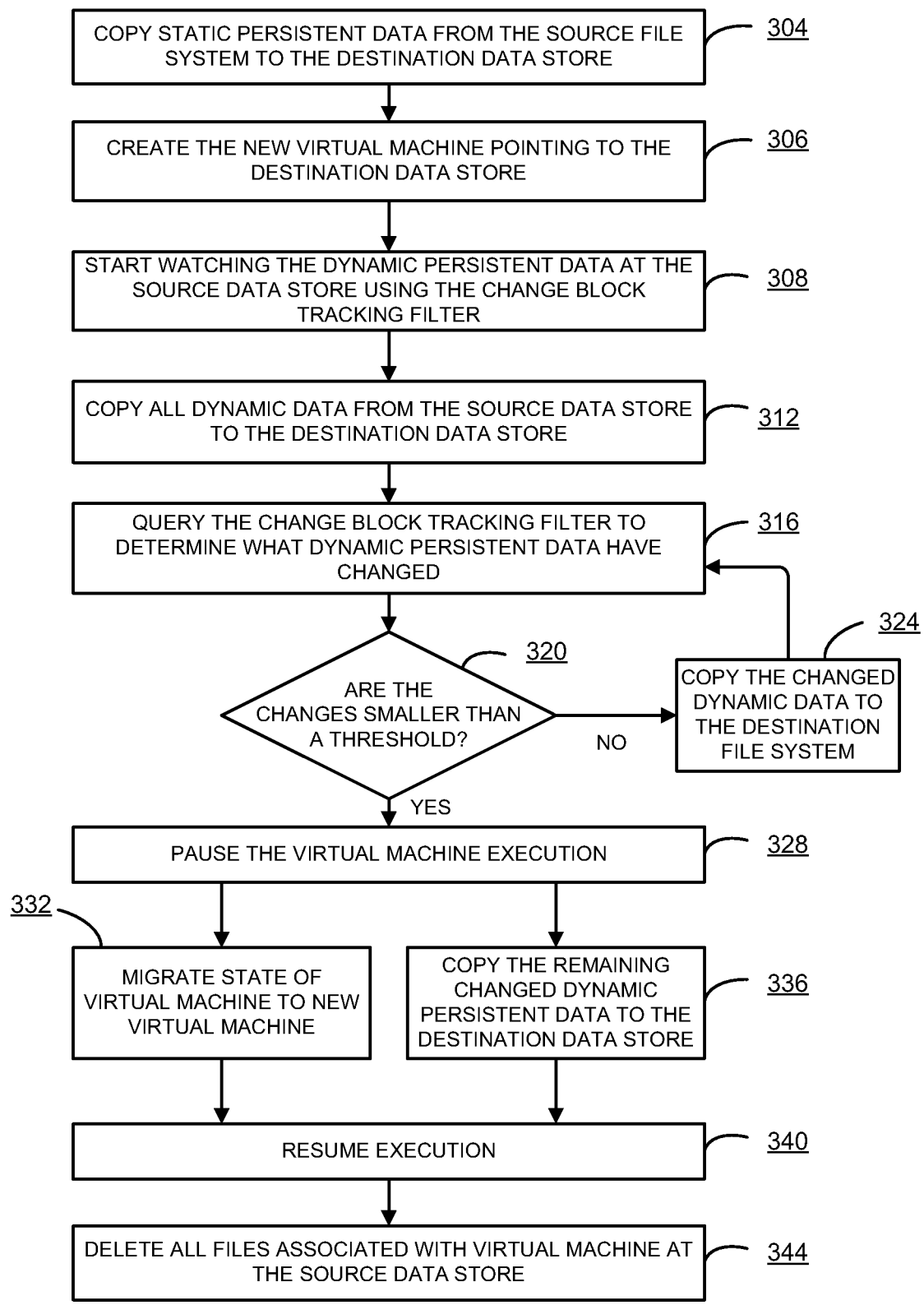
FIG. 3 is a flow diagram that illustrates the process of migrating persistent VM data from a source data store to a destination data store in accordance with one or more embodiments of the present invention.

FIG. 2 depicts a computer system having a virtual machine and source and destination data stores between which a process of migrating persistent VM data according to one or more embodiments of the present invention are carried out. FIG. 3 is a flow diagram that illustrates the process of migrating persistent VM data from a source data store to a destination data store in accordance with one or more embodiments of the present invention. In the example provided herein, a system administrator or automated system may perform migration of dynamic persistent data 256-1 from a source data store 280-1 to a destination data store 280-2 and static persistent data 268-1 from source data store 280-1 to destination data store 280-2. Live migration logic 252 orchestrates the process of migrating the persistent data of a VM 208. In one embodiment, live migration logic 252 may be a program or software component that executes in the VMkernel space of hypervisor 228, and is under control of the system administrator through a virtualized infrastructure management software (not shown) such as VMware's vCenter™. The virtualized infrastructure management software may be executed in a central server or alternatively, in a virtual machine running in a different host or in computer system 200.

Referring now to FIG. 3, in step 304, live migration logic 252 begins, by copying static persistent data 268-1 from source data store 280-1 to its counterpart static persistent data 268-2 on destination data store 280-2. The static persistent data 268-1 may include NVRAM files, configuration files, snapshot information, and various logs. Static data such as file handles may be modified during this operation so that all file handles identifying persistent data on source data store 280-1 are modified to point to copies created or to be created on destination data store 280-2.

In step 306, live migration logic 252 creates a new VM 210 (shown as an empty dashed rectangle) on the same physical host as the original virtual machine whose persistent data will be migrated. In an alternative embodiment, the new VM may be created on a different physical host and, in such an embodiment, live migration of in-memory state of VM 208 to the different physical host would be carried out also.

In step 308, live migration logic 252 begins monitoring a change block tracking (CBT) filter 236 that is provided in hypervisor 228. CBT filter 236 tracks IO operations 220 executed by VM 208. CBT filter 236 also maintains one or more change block tracking (CBT) bitmaps 240 in hypervisor 228. In one embodiment, bitmap entries of 1 indicate that the corresponding blocks have been written to, while bitmap entries of 0 indicate that the corresponding blocks have not been written to. IO operations 220 are captured by VSCSI device 224 and translated into block level IO operations. CBT filter 236 examines the block level IO operations and sets the bit values of bitmap entries corresponding to any of the blocks that are being written to. CBT filter 236 also monitors memory page swaps carried out by hypervisor 228, in particular by kernel swap 232, and sets the bit values of bitmap entries corresponding to blocks of swap files 264-1 that have changed.

For simplicity, a single CBT bitmap is illustrated in FIG. 2. In some embodiments, there may be multiple bitmaps, each allocated to a different type of dynamic persistent data 256-1. For example, there may be one bitmap for each virtual disk 260-1 and one bitmap for each instance of swap file 264-1.

In step 312, live migration logic 252 copies all dynamic persistent data 256-1, including virtual disks 260-1 and swap files 264-1, from source data store 280-1 to destination data store 280-2.

In step 316, after step 312 has been carried out, live migration logic 252 queries CBT filter 236 to determine what dynamic persistent data has changed since the cloning began. In response to the query, CBT filter 236 consults CBT bitmap 240, identifies blocks of the dynamic persistent data that changed since CBT filter 236 was last queried, and clears the bit entries corresponding to such blocks. If, in step 320, live migration logic 252 determines that the number of changed blocks in CBT bitmap 240 has fallen below a threshold, the process proceeds to step 328, where VM 208 is paused for the duration of time needed to copy these last changed blocks. The threshold is set to be low enough so that the amount of time it would take to copy the last changed blocks does not result in VM downtime that is noticeable to the users. The threshold may be predetermined, user selectable, or dynamically adjusted based on operating conditions. In one embodiment, the threshold is set based on the data throughput of the copy operation. The faster the throughput, the larger the threshold can be set such that the remaining data can be transferred without noticeable impact on the VM.

If, in step 320, live migration logic 252 determines that the number of changed blocks exceeds a threshold, the process proceeds to step 324, where live migration logic 252 copies the blocks of dynamic persistent data that have changed (since the last copy iteration) to the destination data store. After step 324, the process returns to step 316, where CBT filter 236 will be queried again for any new changes to blocks. With each iteration of this cycle, the number of changes to the blocks should be reduced, eventually to the point where the number of changed blocks is smaller than the threshold tested in step 320. Once the threshold is reached, the process proceeds to step 328.

In step 328, VM 208 is paused to prevent any new updates to the dynamic persistent data 256-1. During this paused period, VM 208 is not running applications 212 and not servicing any requests. This period of unavailability can be controlled and reduced to a level that is not discernable to users of VM 208 by waiting until the number of changes indicated in CBT bitmap 240 falls below a predetermined threshold as explained above.

Steps 332 and 336 are carried out while VM 208 is paused. In step 332, the in-memory state of the original VM 208 is migrated to new VM 210. More specifically, when VM 208 is deemed ready to be resumed, live migration logic 252 will cause the transfer the in-memory and device states to new VM

210. In one embodiment, known as fast suspend/resume, ownership of memory is transferred to new VM 210, avoiding the overhead of actually copying the memory, which would double the amount of memory consumed. In particular, following the pausing of VM 208, the state of devices emulated in VM 208, except for that VM's memory, is serialized and stored. Metadata that hypervisor 228 is maintaining for pages of virtual memory space allocated for VM 208 are copied and used as metadata for pages of virtual memory space allocated for new VM 210. The state of emulated devices stored earlier is read out, de-serialized and loaded into corresponding devices emulated in new VM 210. New VM 210 then resumes executing guest instructions that were running inside VM 208. The fast suspend/resume process is described in further detail in U.S. patent application Ser. No. 12/559,489, entitled "Method of Suspending and Resuming Virtual Machines", filed Sep. 14, 2009, the entire contents of which are incorporated by reference herein. As explained in that patent application, using this fast suspend/resume operation allows the VM to change configuration parameters, such as file handles that identify the location of persistent data to be changed without any downtime of the VM.

In another embodiment, a complete second copy of the original virtual machine is made, including the in-memory and device states and the set of file handles that are pointing to the persistent data on source data store 280-1. In further embodiments, a new VM process, e.g., new VM 210, need not be initialized and therefore step 306 is not carried out. In such embodiments, VM 208 undergoes a normal suspend and resume or stun and unstun, such that the prior to suspend/stun VM 208 have a set of file handles that point to the persistent data on source data store 280-1 but after resume/unstun VM 208 have a set of file handles that point to the persistent data on destination data store 280-2.

In step 336, live migration logic 252 copies the last set of changed dynamic persistent data to destination data store 280-2.

In step 340, execution of the VM is resumed with all file handles now pointing to the persistent data on destination data store 280-2. Thus, all new IOs will be made to destination data store 280-2. In embodiments using new VM 210, live migration logic 252 deactivates VM 208. It should be recognized that the entire process is carried out transparently to the applications running on the guest operating system.

Finally, in step 344, live migration logic 252 causes the deletion of all the files associated with VM 208 at source data store 208-1.

Figure 4:
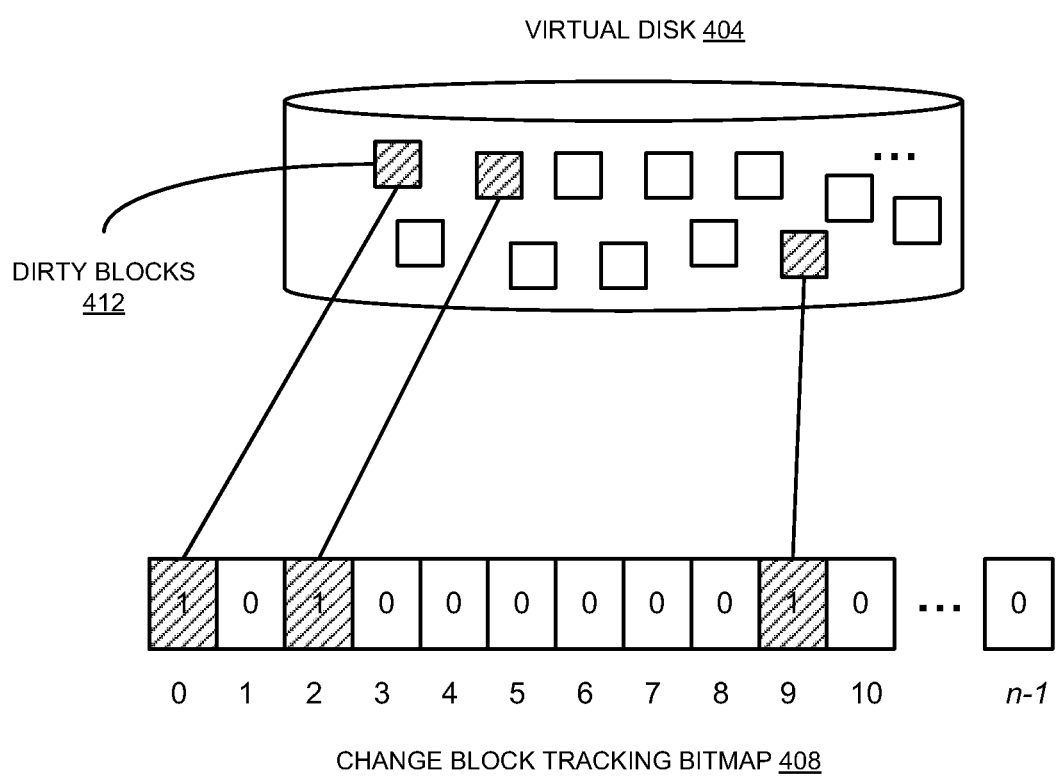
FIG. 4 schematically illustrates the correspondence between a virtual disk and a bitmap data structure that is used in one or more embodiments of the present invention.

FIG. 4 schematically illustrates the correspondence between a virtual disk and a bitmap data structure that is used in one or more embodiments of the present invention. More specifically, virtual disk 404, which is an example of dynamic persistent data, consists of n blocks of storage on some data store. The figure shows only a manageable handful of blocks that can be easily depicted. CBT bitmap 408 is a linear array of n bits, a compact representation of the blocks making up virtual disk 404. In some embodiments, this bitmap may be indexed starting typically at index 0 and ending at index n−1. For each block in virtual disk 404, there is a corresponding entry in the CBT bitmap 408. In the figure, a line connects index 0 of the CBT 408 with a block in virtual disk 404 just to show the correspondence. Similarly, a line connects entry at index 2 of CBT bitmap 408 with this corresponding block in virtual disk 404, and so on for the entry at index 9 in CBT bitmap 408. When a bit at some index is set to 1, this means that the corresponding block in virtual disk 404 has been modified; similarly, when a bit at some index is set to zero, this means that the corresponding block in virtual disk 404 has not been modified. For example, note that at index 0, the bit is set to 1, indicating that the corresponding block in virtual disk 404 is dirty. To emphasize pictorially that a block is dirty in virtual disk 404 the block is crosshatched; this block is indicated by dirty blocks 412. The corresponding entry in the CBT bitmap 408 is also crosshatched just to make it easier to see that the bit is set to 1. Again, note that the indices of this bitmap, which is represented as an array of n bits, begin at 0 and are shown as increasing monotonically to the right ending at index n−1; this is merely for illustrative purposes and should not be construed as limiting the scope of the invention. What is required is that each entry in the bitmap is uniquely identified by some index that makes it possible to access that bitmap entry quickly.

In the embodiments of the present invention described above, the persistent data that are migrated between and across data stores are associated with a virtual machine. In other embodiments of the present invention, the migrated persistent data may be associated with multiple virtual machines, or more generally, any disk image, such as a logical unit number (LUN), a disk volume, or a file system.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for migrating persistent data associated with a virtual machine (VM), the method comprising:

copying static persistent data from a source data store to a target data store, the static persistent data being persistent data associated with the VM that is not accessible by guest software;

creating a new VM using the copied static persistent data:

copying a virtual disk associated with the VM from the source data store to the target data store, wherein dynamic persistent data includes the virtual disk;

monitoring input and output (I/O) disk operations during the copying of the virtual disk, the monitoring including maintaining a data structure identifying each disk block written to by the VM during the copying of the virtual disk, wherein disk blocks that are written to are dirty disk blocks;

iteratively copying dirty disk blocks until a set of dirty blocks is smaller than a threshold number of disk blocks; and after the set of dirty blocks is smaller than the threshold number of disk blocks, stunning the VM, copying remaining dirty disk blocks to the target data store, and when all the persistent data of the VM has been copied to the target data store, resuming execution of the VM using persistent data stored on the target data store.

2. The method of claim 1, further comprising:

modifying the copied static persistent data so that all file handles of the new VM identifying persistent data on the source data store are modified to identify corresponding persistent data on the target data store, wherein after said stunning and before said resuming, the state of the VM is copied to the new VM, and upon said resuming, the new VM continues execution using persistent data stored on the target data store.

* * * * *